INVENTOR
DOMINICK TRINGALI
BY Blair and Buckles
ATTORNEYS

INVENTOR
DOMINICK TRINGALI
BY Blair and Buckles
ATTORNEYS

INVENTOR.
DOMINICK TRINGALI
BY Blair and Buckles
ATTORNEYS

INVENTOR
DOMINICK TRINGALI
BY Blair and Buckles
ATTORNEYS

TIMING DIAGRAM FOR ADAPTOR 34

3,137,121
Patented June 16, 1964

3,137,121
SECONDARY CLOCK CORRECTION AND SYNCHRONIZATION APPARATUS

Dominick Tringali, Litchfield, Conn., assignor to General Time Corporation, New York, N.Y.
Filed July 28, 1961, Ser. No. 127,573
15 Claims. (Cl. 58—24)

This invention relates to secondary clock correction and synchronization for time recorders and the like and more particularly to a mechanism, customarily known as an adaptor, for correcting and synchronizing a typical master-secondary clock system.

As shown in FIGURE 1, a typical master-secondary clock system consists of a master clock and a plurality of secondary clocks spaced in remote locations from the master clock. The secondary clocks may be wall clocks, time clocks, and the like.

In one such system each secondary clock, especially a time recorder clock, is provided with an electromagnet which, by impulses regularly supplied from an adaptor, advances the clock mechanism step by step. Periodically, the minute hands of the secondary clocks are reset to a correct reference with the master clock. This is accomplished by providing means wherein, at longer intervals, such as one each hour, the master clock energizes an adaptor which supplies additional impulses. These additional impulses advance the secondary clock, if it is running slow, to a predetermined minute setting. Here it awaits the master clock. When the time on the master clock coincides with the predetremined minute setting of the secondary clock, the regular impulses to the corrected secondary clock are reinstituted.

A particular and commonly utilized operating and correcting device for a secondary clock in such a system is an "Autoset" Mechanism. This mechanism is fully disclosed and described in U.S. Patent No. 2,332,827, issued October 26, 1943, and assigned to the same assignee as in the present application.

Briefly the Autoset Mechanism accomplishes its correcting function with a D.C. current of reverse polarity by "locking" the advance electromagnet of the secondary clock, if the clock is "on time." However, if the clock is slow, the locking means are disabled and rapid corrective D.C. impulses received from either the master clock or an auxiliary circuit operate the electromagnet of the secondary clock to quickly advance it to the predetermined minute setting. The electromagnet is then locked against further actuation by any remaining corrective impulses. Minute impulses of normal polarity are then again supplied to the secondary clock and it advances in synchronization with the master clock.

It should be evident that the system was correctable only for one hour periods. If, for any reason, such a prolonged period of power failure or erratic current, which permitted this secondary clock to be slow by increments greater than one hour, a proper correction could not be made. An even more complicated situation arose whenever there was a reverse conversion of one hour, from daylight saving to standard time. Since the correcting mechanism could only correct by advancement, up to one hour to a preselected synchronized minute, such reverse conversion was unattainable. At such times, teams of technicians had to be employed for the special purpose of manually resetting all secondary clocks. Even then, a rather complicated procedure had to be followed. After the master clock and associated apparatus was adjusted to the reinstituted standard time, it was necessary to move each secondary clock ahead eleven hours or one full week if it was a time punch clock. The next hourly correction signal from the master clock then brought each secondary clock into phase with the reset master clock. Obviously such practice involved much manipulation of the mechanism and many hours of work at considerable expense. In summary then, it can be concluded that the correcting mechanisms heretofore employed had only limited use, the basic reason being the lack of an enabling mechanism. Such a mechanism had to distinguish between different signals to energize the proper correction means for the one hour, and the 12 hour corrections. In addition, it also had to have enabling mechanism to retard the hour hand so that a change from daylight saving to standard time could be easily made.

Accordingly, an object of this invention is to provide a novel apparatus and a method for correcting and synchronizing a master-secondary clock system over its complete time cycle, including both the one hour and the twelve hour daily cycles as well as the semi-yearly daylight-saving standard time cycles.

Still another object is to provide an apparatus and a method of the above character wherein, at most, one single technician is needed to effect all changes needed for correction and synchronization of the master-secondary clock system during all its cycles.

Another object is to provide an apparatus and a method of the above character wherein the corrections and synchronizations are concluded during a short period by said lone technician, whereby economical maintenance is provided.

Another object is to provide an apparatus and a method of the above character which functions fairly rapidly, thereby minimizing the "down time" or inoperable or inaccurate periods of the secondary clocks.

Another object is to provide an apparatus and a method of the above character wherein the correcting functions are cumulative; that is, each provides an independent correction while the remaining functions are blocked or are rendered ineffectual, whereby accurate correction is assured.

Still another object is to provide apparatus of the above character which can provide a novel one-hour retard function so that conversions from daylight saving to standard time can be easily made.

A further object is to provide apparatus of the above character wherein its one hour retard function operates automatically; after being energized at any time during the preceding twelve hour period.

Another object is to provide an apparatus of the above character which eliminates the relatively slow toothed correction cam, heretofore popularly employed, and substitutes therefor a three level cam arrangement to control and operate the correction circuit.

Another object is to provide an apparatus of the above character which utilizes a novel self-interrupting mechanism for producing correction impulses at a faster rate.

Still another object is to provide apparatus of the above character which may be quickly and conveniently installed into existing master-secondary clock systems.

Another object is to provide apparatus of the above character which utilizes conventional motors, cams, and related electrical hardware in a simplified arrangement to effect economical manufacture thereof and to facilitate the maintenance of the apparatus in operative condition.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

*General Description*

Figure 3:
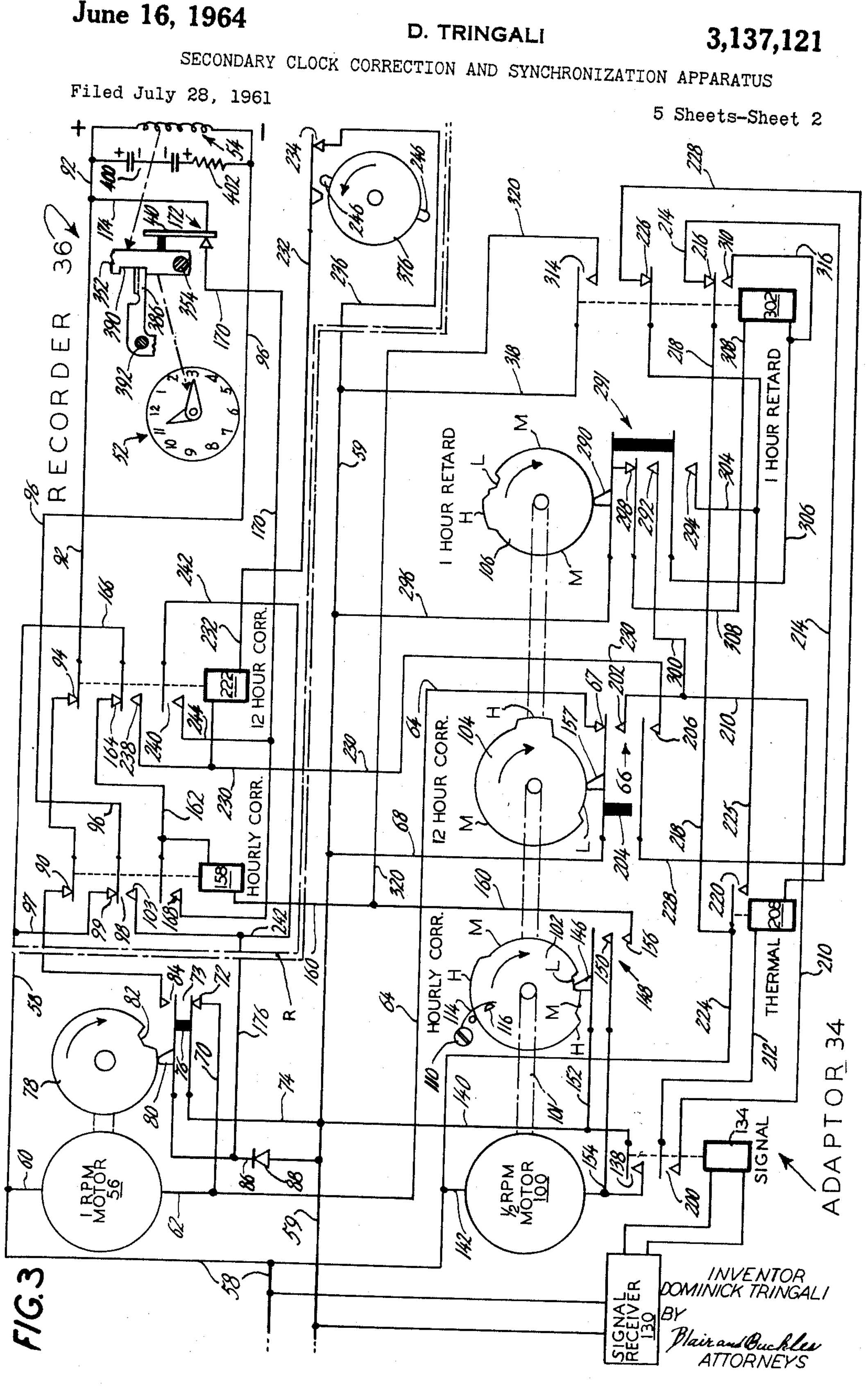
FIGURE 3 is a schematic wiring diagram of that portion of the clock system shown in FIGURE 1 which is most pertinent to the disclosure herein.

As shown best in summary detail in FIGURE 3, the invention herein relates to a master-secondary clock system including a novel arrangement of relays, cam switches operated by synchronous motors, and circuitry in an adaptor 34 which, upon a signal from the master clock, actuate the secondary clock electromagnet 54 through the action of a novel self-interrupter 172 to both advance or to retard the secondary clock to synchronize it with the master clock. The advance takes place automatically once every hour and once every twelve hours, while the retard takes place only upon manual cut-in of a one hour retard actuating circuit.

More particularly, the invention disclosed herein has application to a master-secondary clock system wherein the master clock "orders" a signal transmitter, in circuit therewith, to superimpose a correction actuating signal on the A.C. power lines of the system. Alternatively, the signal may be sent on a direct wire to each secondary clock. A signal receiver 130 associated with the adaptor 34, picks up the signal and actuates a correction initiating relay 134. The relay cuts in a correction motor 100 which operates a one hour, a twelve hour and a one-hour retard cam switch arrangement 102, 104 and 106, respectively (see also FIGURE 2). The one-hour cam switch arrangement, by appropriate circuitry, actuates a one-hour correction operating relay 158 which, by closing certain switches and transferring others, supplies a D.C. current of reverse polarity to the electromagnet 54 of the secondary clock. A novel self-interrupter 172 interrupts the D.C. circuit to rapidly advance the secondary clock to a predetermined minute. Here, the secondary clock is arrested by an autoset mechanism (see FIGURE 4) until the master clock "catches up." Then, both clocks advance to the next succeeding minute "on time" with each other.

The twelve hour correction cam switch arrangement likewise actuates a twelve hour correction operating relay 222, but only after a second signal which cuts in a thermal delay type twelve hour initiating relay 208 to complete a circuit to the correction operating relay 222. This time, however, D.C. time current of normal polarity effects the advancement to a predetermined minute and hour setting. Then, if the electromagnet 54 is fast acting, the one-hour correction takes place during the same hour. If the electromagnet 54 is slow acting, it takes place during the next hour, to advance the clock mechanism to the synchonizing minute. When the master clock "catches up," both clocks advance in customary fashion to the next minute.

The one-hour retard cam switch arrangement is only made effective by manual actuation of a switch 270 (FIGURE 6) of a one-hour retard cut-in circuit associated with the master clock. Upon such cut-in, the normal one-hour correction signal institutes the one-hour retard cycle wherein the thermal delay relay 208 of the twelve hour correction acts to complete a circuit to a one-hour retard relay 302. Relay 302 then completes an auxiliary circuit to the one-hour correction relay which, in its customary fashion, advances the secondary clock to its predetermined minute. However, here, the autoset mechanism holds it in retard for approximately one full hour.

After one hour passes, the next one-hour correction signal energizes the correction cam switch arrangement to terminate the one-hour retard operation. The master and secondary clocks are now synchronized and advance together by the customary minute pulses.

Figure 4:
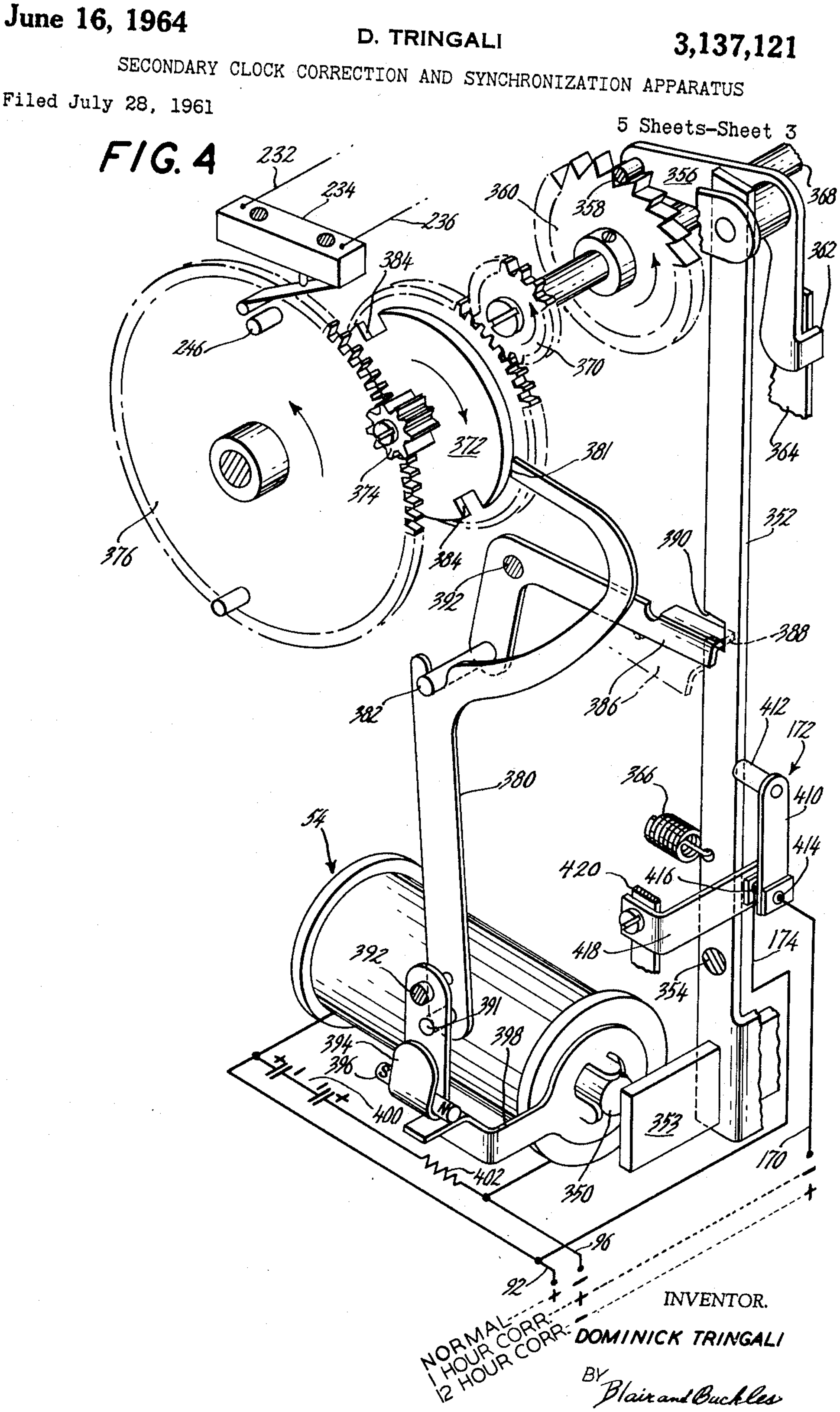
FIGURE 4 is a perspective view of the secondary clock actuator including the autoset mechanism and the self-interrupter for producing the correction impulses.

Included in the above circuitry is a novel self-interrupter 172 which consists of a unique but simple make-break switch (see FIGURE 4). It operates automatically by a spring finger arrangement with the armature of the electromagnet advancing system and the frame of the clock mechanism.

*A Master-Secondary Clock System*

Figures 1, 2:
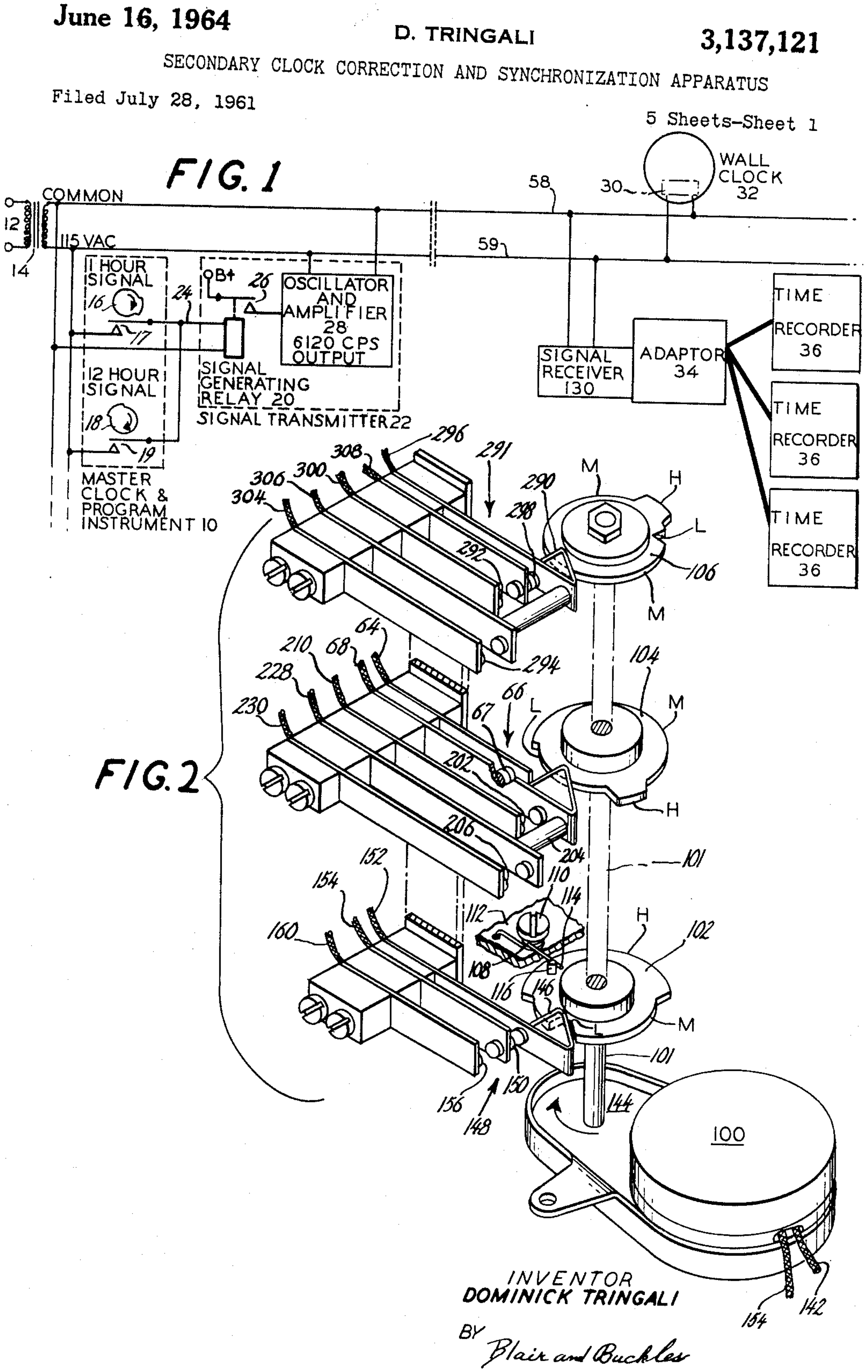
FIGURE 1 is a schematic representation of a typical master-secondary clock system to which this invention has particular application.
FIGURE 2 is a perspective view of the simple three-cam arrangement used in the adaptor for the one hour, twelve hour and one hour retard correction impulses.

Prior to discussing the details of this invention, it will be helpful to have in mind the complete system to which it is applicable. Such a system is shown in FIGURE 1.

A master clock and program instrument 10 receives current from an A.C. power source 12. A transformer 14 may be interposed between the A.C. power source and the master clock to better regulate the current. Two signal cams 16 and 18 in the master clock energize a signal generating relay 20 in signal transmitter 22 via cable conductors 24 once each hour and once each twelve hour cycle of the master clock. The relay closes switch 26 which supplies current to a tuned oscillator 28. The output of the oscillator is then amplified as a 6120 c.p.s. signal and preferably superimposed upon the A.C. power lines. Signal receivers 30 of wall clocks 32 and signal receiver adaptor 34 controlling time recorders 36 are responsive to this signal and upon reception thereof energize correction means in the clocks and the time recorders. The clocks and the recorders are dispersed at various remote locations in a plant, school building, etc.

In lieu of a transmitter-receiver arrangement, a signal carrying conductor may be extended from the master clock 10 directly to the adaptor 34. Obviously in such instances, additional circuit lines will be required and therefore it is not as attractive an arrangement.

The detailed circuit relationship of the signal receiver, the adaptor and the recorder is illustrated in FIGURE 3.

*The Novel Correction and Synchronization Mechanism*

Referring now to FIGURE 3, there is schematically shown in detail the circuit arrangements and interconnections of a modified time recorder 36 (within dotted lines R) and the improved adaptor 34 of this invention. The recorder 36 has the usual step-by-step clock mechanism 52 operated by a electromagnet 54 which receives an impulse every minute from the adaptor circuitry.

*The Adaptor*

The adaptor 34 contains a conventional synchronous minute impulse motor 56 rotating at 1 r.p.m. (see FIGURE 3 for a schematic view). One terminal of the motor is directly connected to A.C. supply leg 58 via minute motor terminal line 60. The other terminal of the motor is connected to the second A.C. supply leg 59 via a minute motor terminal line 62 and then via a parallel circuit arrangement.

One leg of the arrangement includes minute motor seal-in lines 64 and 68 containing normally closed minute motor seal in contacts 67 of a single pole, double-throw cam switch 66. The other leg of the parallel arrangement includes a second set of minute motor seal-ins lines 70 and 74 containing normally closed minute motor seal-in contacts 72 of double switch 73. Both lines 68 and 74 lead to the second A.C. supply leg 59. Double switch 73 also includes minute impulse contacts 84 which are mechanically coupled by a spacer 76 to contacts 72.

Motor 56 drives the minute disk 78 one revolution per minute. At each revolution the resiliently urged minute cam finger 80 falls into a cut-out 82 in the disk. This momentarily opens the minute motor seal-in contacts 72 and closes the minute impulse contacts 84 of double switch 73.

The momentary closure of the contacts of switch 84 completes a circuit to the normally positive or plus side of electromagnet 54. This circuit includes diode line 86, containing diode 88, now closed contacts 84 and electromagnet line 92 including the normally closed one-hour correction bypass switch 90 and the twelve hour correction bypass switch 94. The minus side of the electromagnet is in communication with the A.C. supply leg 58 via electromagnet line 96, normally closed normal polarity contacts 99 of a single pole, double throw, second 12-hour correction bypass switch 98 and line 97.

The electromagnet operates a ratchet mechanism (see FIGURE 4) described hereinafter, to advance clock mechanism 52, one minute. Continued rotation of minute disk 78 again breaks the circuit to the electromagnet 54 by opening switch 84.

It might also be noted that closure of contacts 84 opens the minute motor seal in contacts 72. However, the minute motor remains sealed in by reason of the auxiliary parallel circuit which includes normally closed contacts 67 of cam switch 66 as described above. So long as the minute motor rotates the minute disk, the customary one minute advance of the time recorder continues.

The adaptor 34 is also provided with a second synchronous motor 100 which is hereinafter termed the "correction motor." It is mechanically coupled to a shaft 101 through suitable gearing. A trio of three-leveled cams 102, 104 and 106 are secured to and rotate with the shaft. The motor rotates at a rate of one half revolution per minute. Cams 102, 104 and 106 are instrumental in effecting the hourly, the twelve hourly and the one hour retard corrections hereinafter described in detail.

FIGURE 2 illustrates in perspective the arrangement of the correction motor with respect to the cams. It also illustrates the structural provision for neutralizing against spurious signals in the A.C. line occasionally caused by the operation of motors, generators, electronic apparatus and the like from the same sources. If such spurious signals were not neutralized, there could be erratic initiation of one or more of the corrections, thereby upsetting the synchronization of the master-secondary clock system.

Neutralization is effected by a spirally wound spring 108 affixed to a support stud 110 on frame member 112. The free finger 114 of spring 108 biases against stud 116, affixed to the one hour correction cam 102. Both motors 56 and 100 are of a known slip-clutch type which may be resettable when de-energized. If partial rotation of the cam assembly is initiated by a spurious signal to motor 100, spring 108 will resist excess rotation of the cam assembly. As soon as the spurious signal disappears, the spring 108 will return the cam assembly to its initial rest position. Only a signal, in this instance, a prescribed signal of approximately 8 seconds' duration, will cause sufficient rotation of the cam assembly and particularly cam 102 so that motor hold contacts 150 will close and allow motor 100 to continue rotating when this signal is removed, and cam stud 116 will travel past spring finger 114, thereby initiating correction and synchronization.

Reference is now made to the one hour, twelve hour correction and one hour retard circuits.

*One Hour Correction*

At a predetermined minute and second, as controlled by a preset control drum of customary construction in the master clock, the one hour signal cam 16 closes switch 17 and supplies current to the signal generating relay 20 in the Signal Transmitter 22 (see FIGURE 1). Relay 20 causes switch 26 associated therewith to close and thereby supply current to the oscillator-amplifier circuit 28. The output of the latter is superimposed on the A.C. lines 58, 59 as a 6120 c.p.s. signal of approximately 8 seconds' duration.

For this description, the fifty-sixth minute and tenth second of each hour has been chosen as the predetermined minute and second referred to above. Adaptor 34 responds to such signal because the signal receiver 130 associated therewith (see FIGURE 3) is tuned to receive the 6120 c.p.s. signal.

Referring now to FIGURE 3, the receiver 130 upon receiving the signal energizes correction initiating relay 134. Such energization closes correction motor initiating switch 138 to supply current to correction motor 100 from the A.C. supply legs via line 140, now closed switch 138, motor 100 and line 142.

Supply of current to correction motor 100 effects rotation of cam shaft 101 as well as cams 102, 104, and 106 through a gear train 144 which connects the motor shaft to the cam shaft (see FIGURE 2). The "motor" shaft is coupled to the gear train 144 only when the motor is energized. When the motor is deenergized the cam shaft and gear train are free to rotate. This type of motor is of known construction and commercially available.

As the one-hour correction cam 102 begins to rotate, cam finger 146 of one hour correction tandem switch 148 moves downwardly (in FIGURE 3) or the left (in FIGURE 2) to close correction motor seal-in contacts 150. This seals in correction motor 100 by completion of a parallel circuit around correction motor initiating switch 138 including line 152, now closed contacts 150 and line 154.

At the fifty-sixth minute and eighteenth second of the master clock hour, the transmitted signal is terminated when cam 16 (FIGURE 1) is disassociated from switch 17, thereby causing the signal receiver 130 to de-energize the correction initiating relay 134. Switch 138 now reopens and the initiation circuit to correction motor 100 is thereby terminated. However, motor 100 continues to rotate because correction motor seal-in contacts 150 have sealed it in.

At approximately the fifty-sixth minute and thirty-fifth second of adaptor time, cam finger 157 of the twelve-hour correction cam switch 66 transfers from level L to level H of cam 104. As a result, minute motor seal-in contacts 67 of switch 66 open and thereby interrupt one portion of the parallel circuit to minute motor 56. Shortly before the fifty-seventh minute, cam finger 80 of double switch 73 drops into cut-out 82 of minute disk 78. Motor seal-in contacts 72 are thereupon opened, terminating current to the minute motor 56 via lines 74, 70 and 62.

Simultaneously, cam finger 157 of twelve-hour correction cam switch 66 transfers from level L to level H. As a result, minute motor seal-in contacts 67 of switch 66 opens.

With the opening of contacts 67 and contacts 72, no current can reach the minute motor 56 and hence it stops. Stoppage of the motor 56 arrests the minute disk 78 at the fifty-seventh minute and it remains disabled so long as cam finger 157 rides on level H or level M of cam 104.

Closure of minute impulse contacts 84 by minute cam finger 80 dropping into notch 82 has energized the recorder electromagnet 54. The electromagnet 54 will remain energized so long as cam finger 80 lags in cutout 82. In effect, the electromagnet 54 is locked in an energized state by reason of the non-rotation of minute disk 78.

However, at the fifty-seventh minute, which coincides with the step from level M to H of the one-hour cam 102, one hour correction cam finger 146 further depresses tandem switch 148 to close one-hour correction relay cut-in contacts 156. Closure of contacts 156 completes an A.C. circuit to polar reversing relay 158 via line 152, closed contacts 150 and 156, line 160, through relay 158, line 162, a second normally-closed twelve-hour correction bypass switch 164, and line 166 leading to A.C. supply leg 58.

Energization of relay 158 opens the one-hour correction by-pass switch 90 of electromagnet energization line 92. Similarly, single-pole, double-throw twelve-hour correction by-pass switch 198 is transferred from its normal polarity contacts 99 to its reverse polar contacts 103. Simultaneously, reverse polar circuit completion switch 168 is closed. A current of reverse polarity is thus supplied through the self-interrupting arrangement 172, to be described hereinafter under the sub-heading "Self-Interrupter." This provides the electromagnet 54 with rapid impulses of reverse polarity. It also conditions the autoset mechanism to be described in detail hereinafter. Specifically the circuit now established to electromagnet 54, initiates from diode 88 of diode line 86, line 176, now closed reverse polar cut-in contacts 103, line 96 leading to electromagnet 54, then a portion of line 92, line 174, self-interrupter 172, line 170, now closed one-hour correction cut-in switch 168, line 162, normally closed 12 hour correction by-pass switch 164, and line 166 to connect the two A.C. supply lines 58 and 59.

With completion of this circuit, the electromagnet is continuously energized with a current of reverse polarity but the self-interrupter 172 rapidly interrupts the current thereby rapidly advancing the time recorder clock mechanism 52.

The reverse polar circuit to the self-interrupter is maintained until the clock mechanism 52 is advanced to its fifty-seventh minute. At this point, the auto-set mechanism which has remained conditioned upon completion of D.C. current of reverse polarity to the electromagnet 54, in the secondary clock locks the time mechanism against further advance.

When at the fifty-eighth minute cam finger 146 of the one hour correction cam 102 in the adaptor reaches the end of level H and drops onto level M, it causes tandem switch 148 to open polar reversing relay cut-in contacts 156. This breaks the circuit to the polar reversing relay 158. De-energization of relay 158 permits one hour correction by-pass switch 90 of electromagnet line 92 to close and the single-pole, double-throw, twelve hour correction by-pass switch 98 switches from its reverse polar contacts 103 to its normal polar contacts 99. Normal polarity is now restored to the electromagnet 54. But, the electromagnet 54 is held energized through contacts 84 of switch 73 and the clock advancing mechanism immobilized at the 57th minute.

Meanwhile, the correction motor 100 and the one-hour, twelve-hour and one-hour retard correction cams 102, 104 and 106, respectively, continue to rotate. However, cam finger 157 riding on the twelve-hour correction cam 104, also transfers from its level M to level L. This transfer coincides with the fifty-eighth minute of the master clock, the explanation being that the correction motor 100 was energized at 56′ 10″ and with the degree of rotation and the level of the cam surfaces on cam 104 are so arranged that the drop from level M to L is at 58′ 00″. Such transfer causes minute motor seal-in contacts 67 to close to resume energization of minute motor 56 via line 68, now closed minute motor seal-in contacts 67 of cam switch 66, line 64, and lines 62 and 60.

Re-energization of the minute motor 56 causes minute cam 78 to again rotate, whereby cam finger 80 rides out of slot 82 to open minute impulse contacts 84 and close minute motor seal-in contacts 72. The opening of contacts 84 de-energizes the electromagnet 54 and the clock mechanism advances to the fifty-eighth minute and is therefore synchronized with the master clock.

The correction motor 100 continues to rotate the cams 102, 104, and 106, until one hour correction cam finger 146 is transferred from level M to level L. At this occurrence, one-hour correction tandem switch 148 completely opens and breaks the holding circuit to the correction motor 100. Cams 102, 104 and 106 thus stop rotating. This ends the one hour correction cycle.

*Twelve Hour Correction*

It will be recalled that at every 56th minute and tenth second of master clock time, a signal is transmitted to energize correction initiating relay 134 whereby correction motor initiating switch 138 is closed to supply current to the correction motor 100. Now, in order to effect a 12-hour correction, the control drum in the master clock 10 causes the 12 hour signal cam 18 to rotate and close switch 19 at the 56th minute and 36th second of the eleventh hour. This action energizes signal generating relay 20. Relay 20 closes switch 26 and oscillator 28 superimposes a 6120 c.p.s. signal of 8 seconds' duration onto the A.C. supply lines 58 and 59. The signal re-energizes the correction initiating relay 134 to again close correction motor initiating switch 138 and 12-hour relay energizing switch 200.

It may be recalled that at the 56th minute and 10th second, rotation of the correction motor 100 and associated cams 102, 104 and 106 was intiated by the one-hour correction signal. Subsequently, motor 100 was locked in by closure of correction motor seal-in contacts 150 through the rise of one-hour correction cam finger 146 onto level M and then H of cam 102.

At approximately the 56th minute and 35th second, one second before the 12 hour correction initiating signal is transmitted over the A.C. power lines, cam finger 157, in its usual fashion, transfers from level L to level H of the 12 hour correction cam 104. In so transferring from level L to level H, cam switch 66 opens minute motor seal-in contacts 67 and closes 12-hour initiating relay circuit completion contacts 202 by reason of a tandem switch arrangement including insulating block 204. It simultaneously closes 12-hour correction relay contacts 206.

Closure of contacts 202 completes the circuit to a 12-hour initiating relay 208. The relay is preferably a delay functioning relay such as a thermal relay which requires a signal of a certain duration before it will function. Amperite relay 115NO8T is a typical example.

The completed circuit to relay 208 comprises line 68, now closed contacts 202, line 210, now closed 12-hour initiating relay switch 200, line 212, relay 208, line 214, a normally closed one-hour retard relay by-pass switch 216, and line 218 connected between A.C. supply legs 59 and 58 respectively.

Since the 12 hour initiating relay 208 can only be energized by a signal of a certain duration, in this instance, 5 to 8 seconds, spurious signals or noise effects will not inadvertently energize the relay 208.

The 5 to 8 second signal necessary to energize relay 208 is effected by the second energization of correction initiating relay 134 at the 56th minute and 36th second of the master clock. This second energization uses an 8 second signal and since cam finger 157 of the 12 hour correction cam 104 has simultaneously reached level H, the second signal is further transmitted over the circuit, described in the second preceding paragraph above, to the relay 208. It is effective to initiate a 12-hour correction. At other times when 12 hour initiating relay switch 200 is closed, there is no simultaneous generation of a second signal of 8 second duration. Hence, relay 208 will not be energized.

Energization of relay 208 closes 12 hour correction relay circuit completion switch 220. This completes the circuit to a 12-hour correction relay 222 in the recorder (within the dotted lines of FIGURE 3) via line 224, now closed switch 220, line 225, a second normally closed retard relay 12 hour correction cut-out switch 226, line 228, now closed 12 hour correction relay contacts 206, line 230, 12 hour correction relay 222, line 232, closed 12 hour correction enabling switch 234 and line 236 connecting A.C. supply legs 58 and 59 respectively.

With energization of the 12 hour correction relay 222, a 12 hour correction of the clock mechanism begins. The relay 222 opens 12 hour correction by-pass switch 94, transfers the pole of second 12 hour correction by-pass switch 164 to 12 hour correction relay hold-in contacts 238 and closes 12 hour correction power supply switch 240. Transfer of the pole of switch 164 to contacts 238 effects a holding circuit for relay 222 via line 166, now closed contacts 238, and a portion of line 230 to the relay 222 and thence back to the A.C. supply via lines 232, closed 12 hour connection enabling switch 234 and line 236.

It might also be here appropriately noted that transfer of the pole of switch 164 breaks the circuit to the one hour correction relay 158 via line 162 and disables the relay 158. Such disabling of relay 158 is important because it prevents simultaneous operation of one hour correction relay 158 and 12 hour correction relay 222. If both are operating simultaneously, the fact that they supply current to the electromagnet 54 of different polarities, may cause neutralization of the two currents so that erratic behavior will result. The different polarity of the twelve hour correction will be described hereinafter.

Closure of switch 240 completes a D.C. circuit of normal polarity to the electromagnet 54. This circuit includes a portion of line 86, leading from A.C. supply leg 59, diode 88, line 176, a portion of line 242, now closed 12 hour correction power supply switch 240, switch connecting line 244, a portion of line 170, self-interrupter 172, line 174, and a portion of line 92 leading into the normally positive side of electromagnet 54. The negative side of the electromagnet is circuited to line 96, normally closed normal polarity contacts 99 and line 97 connecting to A.C. supply leg 58.

Completion of the normal polarity D.C. circuit to the electromagnet with the self-interrupter disposed therein causes rapid advancement of the recorder clock. With normal polarity, the autoset mechanism of the recorder to be described hereinafter, is immobilized during the advancement of the clock mechanism.

At approximately the 56th minute and 45th second of the master clock time, and usually while the clock mechanism is rapidly advancing, cam finger 157 transfers from level H to level M of the 12 hour correction cam 104. This transfer opens 12 hour initiating relay circuit completion contacts 202 and 12 hour correction relay contacts 206. However, the transfer is not effective to close the contact switch 67 and the pole of switch 66 remains in a neutralized position. Nevertheless, 12 hour correction relay 222 continues to function by reason of the prior transfer of second twelve hour correction by-pass switch 164 to 12 hour correction relay hold-in contacts 238. Thermal relay 208 has ceased to function due to the limited duration, 8 seconds of the 12 hour correction initiating signal.

It might be here appropriately noted that at the initiation of the 12 hour correction signal, minute motor 56 never stopped rotating until the 57th minute when the minute cam finger 80, in its usual fashion, drops into notch 82 of the minute disk 78. This temporarily stops the minute motor 56 by interruption of current from A.C. supply leg 59 via line 74, open minute motor seal-in contacts 72 and line 70 or by interruption of current through parallel minute motor seal-in line 64, open minute motor seal-in contacts 67 of the 12 hour correction cam 104 and line 68.

Correction motor 100 continues to rotate and the energized 12 hour correction relay 222 continues to rapidly advance the recorder clock with a current of normal polarity until the clock mechanism reaches its 11th hour and 45th minute. At this moment in time, 12 hour correction enabling switch 234 will be opened by an appropriately situated stud 246 associated with the auto-set mechanism. (See FIGURES 3 and 4.) Opening of 12 hour correction enabling switch 234 cuts the A.C. energization circuit to relay 222 flowing through lines 232 and 236. This drops out the 12 hour correction relay 222. Switches 240, 164 and 94 now revert back to their original or FIGURE 3 position and the clock mechanism 52 and electromagnet 54 are now again in circuit with the minute impulse mechanism. However, since the minute impulse mechanism has been arrested when minute cam finger 80 dropped into cut-out 82 to break one of the minute motor hold-in circuits, and 12 hour correction cam finger 157 failed to close minute motor seal-in contacts 67, the clock mechanism 52 likewise ceases to function even though the electromagnet continues to be energized.

If electromagnet 54 has rapidly responding characteristics, cam finger 146 of the one hour correction cam 102 will still be riding on level H. Furthermore, cam finger 157 of the 12 hour correction cam 104 will still be riding on level M. As indicated in the preceding paragraph, the latter condition will hold the minute motor circuit open. Now with 12 hour correction by-pass switch 94 and second 12 hour correction by-pass switch 164 in home position, such as illustrated in FIGURE 3 and with polar reversing relay cut-in contacts 156 of one hour correction tandem switch 148 still closed, the circuit to the one hour correction relay 158 is now re-established. The relay opens one-hour correction by-pass switch 90, transfers the pole of switch 98 to reverse polar contacts 103 and closes the reverse polar circuit completion switch 168 to re-establish a D.C. current of reverse polarity to the electromagnet 54. This reversing of current also conditions the autoset mechanism. In the usual manner of one hour correction impulses, a series of rapid impulses is applied to the clock mechanism 52 to advance it to its usual 57th minute. Here it is arrested by the energized auto-set mechanism where it awaits synchronization with the master clock. At the 58th minute of the master clock, normal polarity is again restored to electromagnet 54 by transfer of cam finger 157 of the 12 hour cam correction switch, from level M to level L. This causes minute motor seal-in contacts to close and energization of minute motor 56 is resumed via line 68, now closed contacts 67, lines 64, 62, minute motor 56 and line 60. Thereafter, both the master clock and the secondary clock are in phase and accurately synchronized.

*One Hour Retard*

Figures 5, 6:
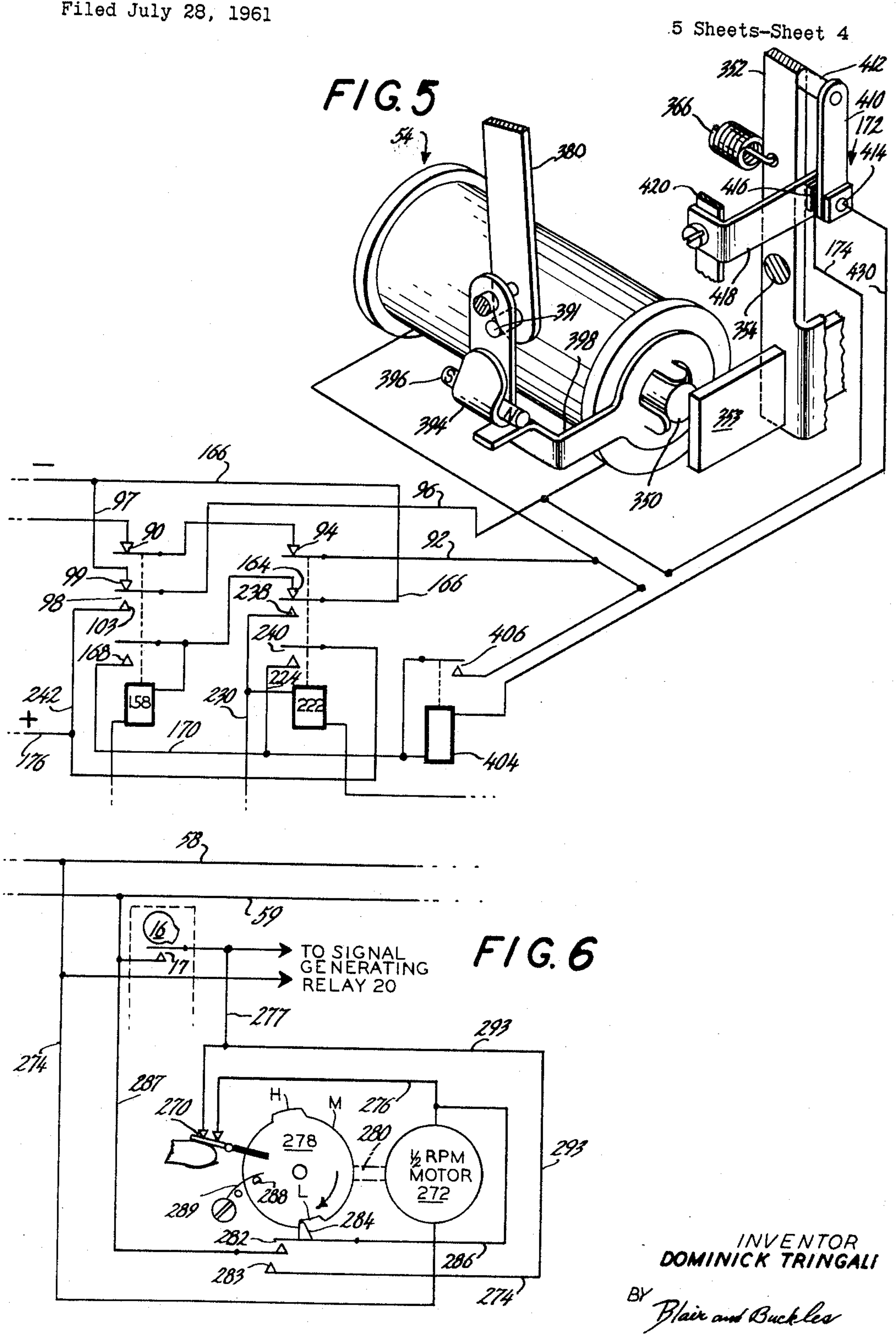
FIGURE 5 illustrates a variation in the circuitry for energizing the electromagnet of the secondary clock actuator.
FIGURE 6 shows a schematic wiring diagram of the "one hour retard" instituting mechanism.

Reference is now made to FIGURES 3 and 6 which illustrate best the one hour retard circuit and operating mechanism.

In the usual situation, where a change is to be made from Daylight Saving to Standard time, the master clock 10 with its control drum and associated signal generating apparatus is first turned back to Standard time. Obviously, at this point all of the wall clocks 32 and time recorders 36 in the system are "ahead" by at least one hour. In correcting mechanisms heretofore known, the mechanisms were ineffectual to turn the secondary clocks back for they could only make advance corrections. Thus, in converting from Daylight Saving to Standard time, it was generally necessary to employ a team of technicians to turn back all the secondary clocks at the various remote locations to a time which was slow with the master clock. The one hour correction system would then, at the next hour, bring the secondary clocks into synchronization.

With this invention, it is now possible to retard the secondary clocks automatically.

Such automatic operation is easily accomplished by one technician who initiates the automatic operation by actuating the one hour retard manual switch 270 (see FIGURE 6) contained in the master clock. Alternatively, the switch with its related circuitry may be contained in a separate housing and be connected in series with the 1 hour signal cam of the master clock.

Upon manual depression of switch 270 the one hour retard correction initiating circuit is conditioned for energization by the customary one hour correction initiating signal from the control drum. Upon receiving this signal (at 56′ 10″), one hour retard motor 272 (½ r.p.m. synchronous type) begins to function by supply of A.C. current via line 274, motor 272, line 276, closed switch 270, line 277 leading to 1 hour signal cam switch 17 which is in series circuit with A.C. supply. Motor 272 rotates cam 278 affixed to motor shaft 280.

As the cam rotates one hour retard initiating contacts 282 close by transfer of cam finger 284 from level L to level M of cam 278. This transfer establishes a holding circuit for the one-hour retard motor 272 via line 286, now closed cam switch 282 and line 287 leading to one of the A.C. supply legs.

Now, at approximately the 56th minute and 20th second of the hour in which manual switch 270 was depressed and after the customary one hour correction signal has initiated rotation of cam 278, a stud 288 on cam 278 trips the manual switch to open it. Thereafter, because of the open state of switch 270, any hourly corrective signals subsequently transmitted will be ineffective to energize the one hour retard motor 272. It should also be noted that the lapse of time between the original initiating one hour correction signal (56′ 10″) and the opening of switch 270 (56′ 20″) is sufficient to overcome the force of spring finger 289 affixed to a stud on the frame (not shown).

The customary one hour correction signal (56′ 10″) which energized the one hour retard correction motor 272 also energizes the correction motor 100 as explained in the "one hour correction" section above. The motor is eventually sealed in by reason of the prior actuation of one hour retard manual switch 270, the two corrections, one hour retard and one hour correction will now transpire.

As the one hour correction cam 102 rotates, in its usual fashion as noted above, cam finger 146 transfers from level L to level M. Such transfer seals in the correction motor 100 and also energizes the one hour correction relay 158 to establish a D.C. circuit of reverse polarity to electromagnet 54 as described above in the section entitled "One Hour Correction." It will be recalled that this circuit of reverse polarity advances and then conditions the auto-set mechanism of the clock mechanism 52. Thereafter, all time recorders 52 are arrested at the 57th minute.

Meanwhile, correction motor 100 (FIGURE 3) and one hour retard motor 272 (FIGURE 6) continue to rotate.

At approximately the 57th minute and 10th second, one hour retard cam finger 290 transfers from level M to level H of the one hour retard cam 106 (see FIGURE 3). This causes cam switch 291 to close 12 hour initiating relay cut-in contacts 292 and one hour retard initiating relay cut-in contacts 294. Closure of contacts 292 completes a circuit to the 12 hour initiating relay 208 via line 296, normally closed one-hour retard termination contacts 298, now closed 12 hour initiating relay cut-in contacts 292, line 300, a portion of line 210, now closed 12 hour initiating relay switch 200, line 212, 12 hour initiating relay 208, line 214, normally closed one hour retard relay by-pass switch 216 and line 218, which connects with the A.C. supply legs 58 and 59, respectively.

At the same time (57′ 10″), cam finger 284 of the one hour retard initiating circuit transfers from level M to level H to close contacts 283. It remains on level H for about 10 seconds. This causes a circuit to be established from the A.C. supply legs via line 287, closed contacts 282 and 283, line 293 and a portion of line 277. This energizes the signal generating relay to send out another 6120 c.p.s. signal on the A.C. lines.

After a period of about 5 to 8 seconds, the thermal delay type 12 hour initiating relay 208 becomes energized. It should be noted that this delay feature prevents accidental actuation by spurious signals.

Relay 208 closes 12 hour correction relay circuit completion switch 220 to seal in one hour retard relay 302. This circuit includes line 224, now closed switch 220, line 225, line 304, now closed one hour retard initiating relay cut-in contacts 294, line 306, relay 302, line 308, normally closed one hour retard termination contacts 298, and line 296 connecting the two A.C. supply legs 58 and 59.

Energization of the one hour retard relay 302 transfers one hour retard relay by-pass switch 216 to its relay cut-in contacts 310. The relay also opens retard relay 12 hour correction cut-out switch 226 and closes auxiliary one-hour correction relay circuit switch 314.

Transfer of switch 216 to its cut-in contacts establishes a holding circuit for the relay 302 via lines 218, now closed relay cut-in contacts 310, line 316, line 306, relay 302, line 308, normally closed one hour retard termination contacts 298 and line 296 connecting the two legs of the A.C. supply.

Opening of retard relay 12 hour correction cut-out switch 226 cuts the circuit to the 12 hour correction relay 222 so that it will not be energized during the one hour retard period.

Closure of switch 314 establishes an auxiliary circuit to the one hour correction relay 158 so that relay 158 will continue to energize electromagnet 54 with a reverse polar current. This conditions the auto-set mechanism (see FIGURE 4) so that the recorder will continue to be arrested at its 57th minute. In effect, the auto-set mechanism is now utilized to arrest the time recorder for the one hour retard cycle. It is subsequently released by the usual operation of the next hourly correction cycle, as described hereinafter. The auxiliary circuit established by closure of switch 314 includes lines 318, now closed switch 314, line 320, a portion of line 160, relay 158, line 162, closed second 12 hour correction by-pass switch 164, and line 166, which connect between the two legs of the 59 and 58 A.C. supply.

When the one hour retard cam finger 290 transfers from level H to level M of cam 106 at (57′ 20″) such transfer causes contacts 292 and 294 to open. The original circuit to the one hour retard relay 302 as well as the circuit to 12 hour initiating relay 208 is therefore broken. As relay 208 drops out, switch 220 opens. Retard relay 302 remains energized through the hold-in circuit, described above.

Coincident with the initiating circuit termination of one hour retard and 12 hour initiating relay 208, cam finger 284 of the one hour retard cam 278 (see FIGURE 6) transfers from the level H to level M. It will be remembered that this cam was set in motion by the customary one hour correction signal sent out by the signal transmitter by order of the master clock and control drum. Transfer of cam finger 284 causes contacts 283 to open. As a result, the signal transmitter stops superimposing its 6120 c.p.s. signal onto the A.C. power line. One hour retard motor 272, however, continues to rotate because cam switch 282 remains closed when the cam finger is on level M.

Shortly after the 58th minute of the master clock 10th hour, cam finger 284 transfers to level L of cam 278 to thereby open switch 282. This de-energizes motor 272. At about the same time, cam finger 146 of the one hour correction cam 102 transfers from level M to level L and opens the circuit to correction motor 100. All cams are now quiescent, and the auto-set mechanism holds the secondary clock at the 57th minute. In this condition, the usual minute impulses are ineffective to advance the time recorders because the hourly correcting relay 158 remains energized via the alternate circuit established by the now-energized one hour retard relay 302, and the auto-set mechanism locks the arresting disc 372, as explained hereinafter.

All time recorders in the master-secondary clock system are now held arrested for approximately one hour. The master clock 10 and related control drum, however, continue to advance. It will be recalled that the master clock has been preset to Standard time. Now, when the master clock reaches the next succeeding 56th minute and 10th second, it "orders" the signal transmitter to send out the customary one hour correction signal.

Signal receiver 130 picks up the signal and energizes correction initiating relay 134. Correction motor initiating switch 138 and 12 hour initiating relay switch 200 close. Correction motor 100 receives current so that it will rotate cams 102, 104 and 106. Since all of the time recorders are already at the usual correcting 57th minute, there is no advance of the time recorders. Instead, the customary one hour correction signal merely energizes the correction motor 100. One hour retard motor 272 (see FIGURE 6) will not be actuated because switch 270 has been opened during the previous hour.

Now when the master clock arrives at the 56th minute and 36th second of that next hour, cam finger 157 of the 12 hour correction cam transfers from level L to level H. This closes 12 hour initiating relay circuit completion contacts 202 and 12 hour correction relay contacts 206. Twelve hour relay 222 is not, however, energized because the one hour retard relay continues to hold switch 216 open. Furthermore, in the example set out, stud 246 holds 12 hour correction enabling switch 234 open so that 12 hour correction relay 222 cannot function.

The correction motor 100 continues to rotate the connection cams 102, 104 and 106 without incident until approximately the 57th minute and 5th second. At this time cam finger 290 transfers from level M to L of cam 106. Contacts 298 now open and drop out the one hour retard relay 302. One portion of the parallel circuit to the one hour correction relay 158 is now broken. However, at this time cam finger 146 is riding on level H of cam 102 (as previously explained) and maintains relay 158 energized via switch 156. At the 58th minute cam finger 146 transfers from level H to M of cam 102 whereby contact 156 opens and one hour correction relay 158 drops out. The auto-set mechanism now becomes disabled.

It will be recalled that minute cam finger 80 has remained in notch 82 during the one hour correction period. When the autoset mechanism is disabled, as noted in the preceding paragraph, the clock mechanism is again conditioned for advancement. The dropping out of relay 158 re-establishes a circuit of normal polarity to the electromagnet.

Meanwhile cam finger 157 of twelve hour correction cam has dropped to level L and established a power circuit to the minute motor. Minute disc 78 thereby begins to rotate to move cam finger 80 out of notch 82. The secondary clock then advances to the 58th minute, on time with the master clock.

Meanwhile, cam finger 146 transfers to level L of one hour correction cam 102. This opens the circuit to the correction motor 100 by opening of contactor 150. Rotation of cams 102, 104 and 106 stops.

Thus, a one hour retard has been accomplished automatically.

*Autoset Mechanism*

In each of the corrections, described in detail above, reference was made to an autoset mechanism. This mechanism is described in detail in Patent No. 2,332,827. As described in detail in that patent, and as shown in simplified form in FIGURE 4 herein, and with some slight modification over the mechanism shown in the patent, it, in essence, consists of the electromagnet 54 and certain interconnected gears and levers which both advance and "hold" the clock mechanism at some predetermined time. The core 350 of the electromagnet attracts shoe plate 353 of an armature 352 by magnetic force when the electromagnet is energized. Armature 352 is pivoted to the frame of the time recorder at pivot 354. Its upper end is pivotally mounted to an actuating pawl 356 whose forward end contains a ratchet stud 358 which acts upon ratchet gear 360. The rear end of the pawl contains a motion limiting finger 362 which, during actuation of the pawl, contacts a portion 364 of the time recorder frame to limit the span of movement of the pawl.

Thus, upon supply of a D.C. current to the electromagnet 54, the upper end of armature 352 (as seen in FIGURE 4) will be pivoted clockwise and the ratchet stud 358 will slide over one tooth of ratchet gear 360 into cocked position with respect to a rotary movement of gear 360. Now, upon interruption of the current to the electromagnet by the self-interrupter 172, spring 366 pulls the upper end of the armature 352 counter-clockwise. Cocked stud 358 advances the ratchet gear 360 one notch or tooth counterclockwise. Such rotation of the gear 360 advances the clock mechanism 52 (not shown in FIGURE 4) which is operatively connected to shaft 368. Since each tooth in gear 360 represents one minute advance, the clock mechanism advances one minute.

The forward end of shaft 368, is connected to and therefore simultaneously rotates the clock mechanism arresting disk drive gear 370. As evident from the illustration in FIGURE 4, rotation of gear 370 in a counterclockwise direction, as shown by the arrow thereon, will rotate arresting disk 372 in a clockwise direction and conversely drive gear 374 secured to the same shaft as the arresting disk 372, will drive 12 hour correction enabling switch actuation gear 376 counter-clockwise. Studs 246 on gear 376 engage the 12 hour correction enabling switch 234 at each half rotation.

An arresting lever 380 acts upon the arresting disk 372 during each hour correction, as will be explained hereinafter. The lever pivots about pin 392 and, in fact, laterally moves a pin 382 which is affixed to the end of one arm of an armature blocking lever 386. Such lateral movement causes arresting nose 381 of the lever 380 to move into and out of arresting notches 384 in the arresting disk 372.

The blocking nose 388 of the other arm of armature blocking lever 386 normally resides within notch 390 in the armature 352. The lever pivots upon a pin 392 secured to the frame of the time recorder.

Reverting back to the structure of the arresting lever 380, its lower end is free and is connected via pin 391, to a pivotable permanent magnet holding clip 394. The clip contains a permanent magnet 396, the forward end has North polarity as indicated by the letter N superimposed thereon. A magnetic field transmitting shoe 398 underlies this forward end. The shoe is connected to the forward end of the electromagnet 54. For the reasons explained hereinafter, it transmits the magnet field generated by the electromagnet to the magnetic field of the permanent magnet.

During customary operation of the electromagnet, that is, minute advance of the clock mechanism 52 using a D.C. current of normal polarity, the forward end of the electromagnet 54 has North polarity. Since the forward end of the permanent magnet 396 also has a North polarity, it will be repelled. Such repulsion will pivot the arresting nose 381 of lever 380 away from arresting disk 372. Thus, the clock mechanism can continue to advance at each minute.

During a one hour correct cycle as discussed in detail above, the D.C. current to the electromagnet 54 is reversed. Thus the polarity of the solenoid is reversed and a "South" field is imparted to its forward portion as seen in FIGURE 4. This "South" magnetic field is transmitted by transmitting shoe 398 to the forward "North" magnetic field of the permanent magnet 396. Since opposite poles attract, holding clip 394 moves forwardly. This pivots the arresting lever nose 381 against the arresting disk 372 and it rides on the periphery of the disk in a "conditioned" state. Meanwhile, the clock mechanism is being rapidly advanced. At the 57th minute of the secondary clock mechanism, one of the notches 384 in the arresting disk 372 presents itself to the arresting lever nose 381. The magnetic attraction of the permanent magnet 396 and the magnetic field of the electromagnet as transmitted by the magnetic shoe 398 further pivots the lever 380 counter-clockwise. Arresting lever nose 381 thus enters notch 384. Simultaneously, the armature blocking nose 388 is pivoted downwardly, as shown in dot and dash lines in FIGURE 4, and eventually out of notch 390 as the armature 352 rocks back in response to the force of the electromagnet. This blocks the pivot action of the armature 352 and advance of the clock mechanism is thereby terminated.

At the 58th minute of the master clock when normal polarity is restored, the permanent magnet 396 is again repelled by the normal "North" polarity of the electromagnet. The arresting lever nose 381 is pivoted out of arresting notch 384 and the armature blocking lever nose 388 is pivoted upwardly to position itself opposite notch 390. Thereafter, neither the arresting disk nor the armature is blocked. Spring 366 pulls the upper end of the armature 352 counter-clockwise to advance the recorder clock to its 58th minute, on time with the master clock.

To insure a complete stroke of the electromagnet, at each energization thereof, and to prevent reactivation of the electromagnet prior to a complete working stroke, a stroke completion circuit has been built across the terminals of the electromagnet. In one embodiment, this circuit includes a dual electrolytic type capacitor 400 consisting of two 8 mfd. capacitors arranged back to back in series with a resistor 402 of 150 ohms. This arrangement maintains a charge on the coil of the electromagnet 54 for a short time after the circuit to the coil has been terminated.

In another embodiment, shown in FIGURE 5, a relay 404 and an associated contact 406 is utilized to replace the RC circuit shown as FIGURES 3 and 4. The normal one minute advancing pulses are routed to the electromagnet 54 in substantially the same manner previously described, and the relay 404 and self-interrupter circuit 172 by-passed. However, during one hour and twelve hour correction operations, relay 404 is brought into circuit with self interrupter circuit 172.

During one hour correction, relay 158 is energized, as previously explained, and contact 98 associated therewith is closed. The positive side of the line is applied to electromagnet 54 via line 96 which is normally the negative input thereto. Closure of contact 168 applies the negative input to relay 404 via line 166, closes contact 164, then closes contact 168, line 170, relay 404, line 430, and closes self-interrupter 172, and line 174 to the now positive line 96. Relay 404 energizes and closes contact 406 which supplies the negative input to electromagnet 54 via line 170. As previously explained, with reverse polarity applied to electromagnet 54, the autoset mechanism becomes effective. Furthermore, armature 352 is actuated and opens the self-interrupter circuit 172, whereupon relay 404 de-energizes. Contact 406 now opens and allows the electromagnet 54 to de-energize, which advances the recorder clock mechanism 52. The above sequence occurs in rapid fashion until the autoset mechanism arrests the recorder clock at the 57th minute as hereinbefore set forth.

During 12 hour correction, it will be remembered that relay 222 is energized. Normal polarity is established to electromagnet 54, but in the present instance via relay 404 and associated contact 406. Closure of contacts 240 establishes a path for the positive side of the line to relay 404. The circuit to relay 404 is completed via line 430, self-interrupter 172, line 174, 96, and now closed switch 99 back to the negative input. Closure of contact 406 connects the positive normal polarity input to electromagnet 54 via contact 240. Normal polarity negative input is applied to electro-magnet 54 via the now closed contact 99 and line 96. Operation of the self-interrupter opens the circuit to relay 404, whereupon contact 406 opens. Electromagnet 54 is then de-energized and the recorder clock advanced one minute. Again the recorder clock is rapidly advanced to the predetermined minute, whereupon 12 hour relay 222 is de-energized.

Thus it can be seen, in the embodiment of FIGURE 5 that positive and harmonic control over the energization and deenergization of electromagnet 54 is effectuated during one hour and 12 hour correction.

*Self-Interrupter*

As seen best in FIGURES 4 and 5 the novel self-interrupter 172 referred to above, in the several detailed descriptions, consists of a spring finger 410 which cooperates with armature 352 by means of member 412. The free end of the spring finger contains a contact 414 which is insulated from the spring finger. It is in circuit with line 174 leading to electromagnet 54. (See FIGURE 3.) Opposing contact 414 is a fixed contact 416 which is in circuit with line 170. It is secured to, but insulated from, fixed contact support finger 418 which is secured to frame member 420 of the recorder.

It should be evident, from FIGURE 4, that as the upper end of armature 352 is pivoted clockwise, contact 414 moves away from contact 416 and the circuit to the electromagnet is broken. Breaking of current to electromagnet 54 will release armature shoe 353. Spring 366 then pulls the upper end of the armature 352 counter-clockwise. This causes contact 414 to engage contact 416 to re-establish the D.C. circuit to the electromagnet 54. The electromagnet then again pulls the armature shoe plate 353 to itself to separate and thereby break the contact. Obviously, this action occurs rather rapidly, thus effecting rapid advancement of the clock mechanism via pawl 356 acting upon ratchet gear 360.

Upon restudy of the section entitled "Autoset Mechanism," and keeping the operation of the self-interrupter on the electromagnet circuit in mind, it will become evident that the armature blocking lever 386 will, when properly pivoted, terminate action of the interrupter. Since the armature 352 is blocked in a clockwise extreme position, contact 414 will be unable to engage contact 416. Thus, although the electromagnet 54 may be energized, there is no series of pulses and the only function of the energized electromagnet is to effect a safe, sure and effective "hold" of the clock mechanism at its 57th minute.

*Operating Sequence*

Figure 7:
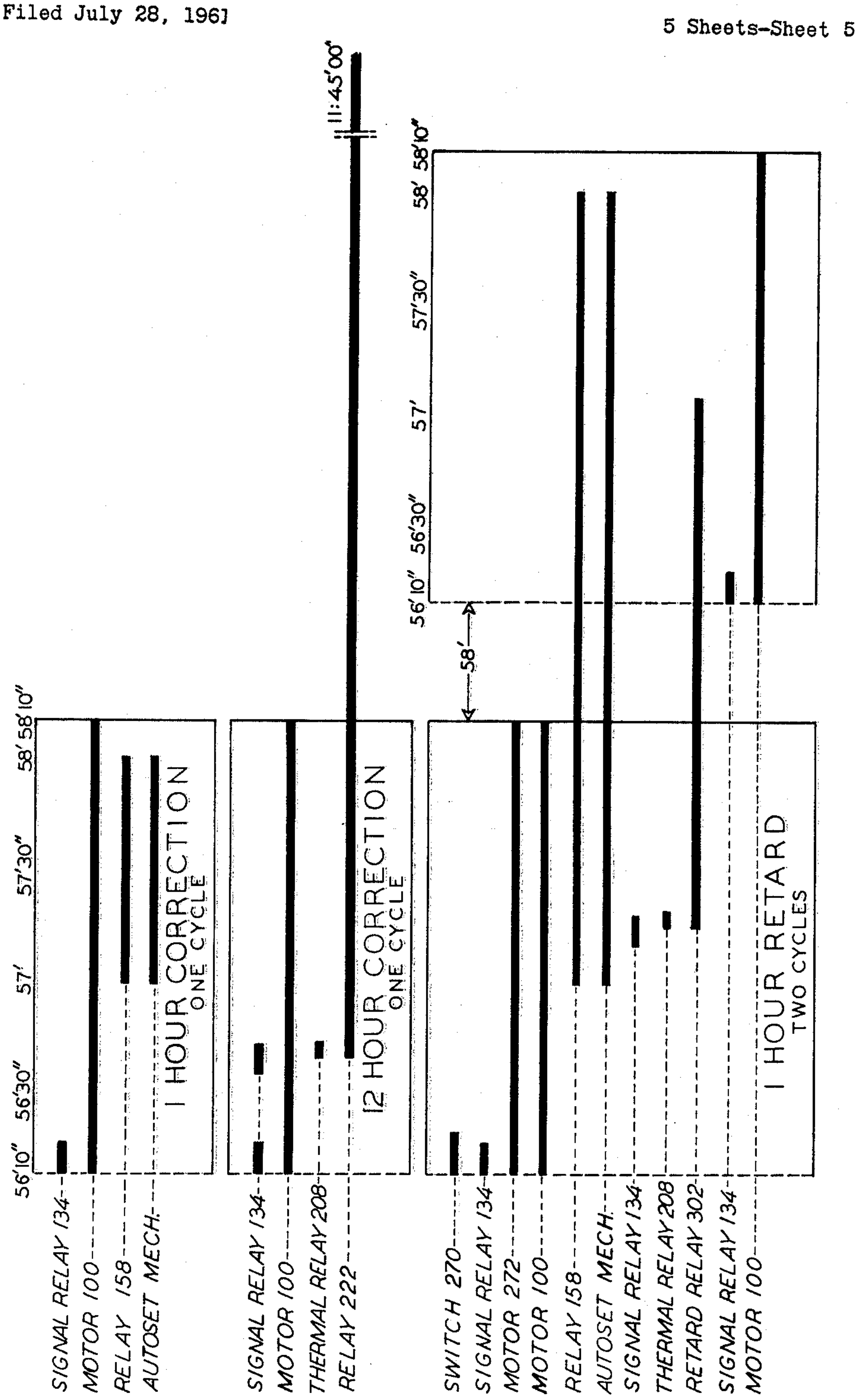
FIGURE 7 is a timing diagram illustrating the operation of each correction circuit in the mechanism of this invention.

In order to fully understand the invention, it will be helpful, at this point, to review by particular reference to the timing diagram of FIGURE 7, the operating sequence of the correction and synchronization mechanism above.

In the usual situation, both the master clock and the secondary clocks are powered by the same A.C. line. A synchronous A.C. motor 56, in the adaptor 34, rotating at a rate of 1 r.p.m. causes closure of minute impulse contacts 84 (see FIGURE 3) once each minute. This permits D.C. current of normal polarity, as generated by diode 88, to energize the electromagnet 54 which, through armature 352 and actuating pawl 356, advances the minute hand of the clock mechanism (see FIGURE 4).

By referring to the timing diagram of FIGURE 7, it will be seen that at the 56th minute and 10th second of every hour on the master clock, its control drum orders out a 6120 c.p.s. signal of approximately 8 second duration by the signal transmitter. In the preferred form, this signal is superimposed upon the A.C. power lines. Upon receipt of this signal, relay 134 is energized to complete a circuit to correction motor 100. The motor rotates at the rate of one-half revolution per minute. By reason of the configurations of cam 102 to its related contact 150, the correction motor makes one complete revolution and then stops. Thus, two minutes, as shown in FIGURE 7, is the duration of energization of correction motor 100.

Rotation of one hour correction cam 102 institutes a circuit to one hour correction relay 158. This relay, as described in detail above, completes a circuit of reverse polarity to the terminals of the electromagnet 54. Its duration of energization is about one minute as determined by level H of cam 102. (See the timing diagram FIGURE 7.)

Completion of a D.C. circuit of reverse polarity to the electromagnet places the autoset mechanism in latent condition for arresting the clock mechanism when it reaches its 57th minute, upon completion of its correction cycle. Meanwhile, the self-interrupter 172 rapidly interrupts the D.C. current of reverse polarity to the terminals of the electromagnet 54 to advance the clock mechanism to its 57th minute where it is arrested. When finger cam 146 drops to level M of cam 102, the current to the relay 158 is cut. This terminates the D.C. current or reverse polarity to electromagnet 54. At the same time cam finger 157 of 12 hour correction cam 104 reaches the end of level M and contacts 67 are again closed to re-establish the A.C. power supply to the minute motor. It will be recalled that the correction motor began to function when the master clock sent out the hourly correction signal at 56′ 10″. Thus, by properly profiling cams 102 and 104, the re-established current to minute motor 56 can be synchronized with the 58th minute of the master clock. When cam finger 146 drops from level M to L of cam 102, motor 100 is deenergized and the correction cycle is completed.

Once every 12 hours the control drum of the master clock "orders" the transmitter to send out a 12 hour correction signal. Obviously, this 12 hour correction signal can be sent out at any hour and minute. In the instance shown in FIGURE 7, however, it is sent out at 56′ 10″ with a follow-up signal at 56′ 36″. Signal receiver 130 of the adaptor (see FIGURE 3) picks up the signal, energizes relay 134 to eventually seal-in correction motor 100 for 2 minutes. Relay 134 then drops out upon termination of the 56′ 10″ signal. At 56′ 36″, a second signal of 8 seconds duration is ordered by the master clock. This again energizes relay 134 to again close 12 hour initiating relay switch 200 which completes a circuit to 12 hour initiating relay 208. In the meantime, 12 hour correction cam 104 has rotated sufficiently to cause cam finger 157 to transfer to level H (56′ 35″) whereby contacts 202 and 206 are closed. Closure of contacts 202 seals-in relay 208 to maintain 12 hour relay circuit completion switch 220 in closed condition. A sufficient energization time (10 seconds) is thereby imparted to energize 12 hour correction relay 222. Relay 222 seals itself in by closure of 12 hour correction relay holding contacts 238.

Energization of relay 222 also closes 12 hour correction power supply switch 240. Thus, a D.C. current of normal polarity is supplied to the electromagnet to advance the clock mechanism via the self-interrupter 172 to its 11th hour and 45th minute. At this time, 12 hour correction enabling switch 234 is opened by an (see FIGURE 4) appropriately situated stud 246 on 12 hour correction enabling switch gear 376. Opening of switch 234 cuts the A.C. energization circuit to relay 222 to drop it out. Switch 240 opens and the D.C. current of normal polarity to the electromagnet is terminated.

If the the electromagnet has rapidly responding characteristics, the one hour correction function may now still take place. If not, the one hour correction will take place at the next hour. In the first situation, cam 146 will still be riding on level H of cam 102 and cam 157 will still be riding on level M of cam 104. Switch 156 will, thus, still be closed when the 12 hour correction ends. Hence, relay 158 receives power to transfer switch 98 to reverse polar contacts 103 and to close switch 168 to complete a D.C. circuit of reverse polarity to the electromagnet, whereby with the self-interrupter 172, a series of D.C. impulses is imparted to the electromagnet to advance the clock mechanism to its customary 57th minute-one hour correction arresting position.

At this point, arresting lever 380 with its arresting lever nose 381 enters into arresting notch 384 and the clock mechanism is held at the 57th minute.

When the master clock reaches its 58th minute, the D.C. current of reverse polarity is broken, as explained above. Minute motor 56 is again placed back in circuit to send minute impulses of normal polarity to the electromagnet. The secondary clock is now on time with the master clock. This ends the twelve hour correction.

As evident from the timing diagram of FIGURE 7, the one hour retard correction is somewhat more complicated.

The first step in the one hour retard operating sequence involves manual actuation of switch 270 by the custodian of the building or other technician in charge of the apparatus.

When the master clock orders the customary 56th minute, tenth second signal during the hour in which the manual switch was actuated, one-hour retard motor 272 begins to rotate. It eventually seals itself in for a two-minute period, as seen in the timing diagram of FIGURE 7. Meanwhile, manual switch 270 has been made ineffective.

The one-hour correction signal simultaneously energizes signal relay 134 for approximately 8 seconds, and this seals correction motor 100 in for a two-minute period.

Rotation of correction motor 100 causes energization of one-hour correction relay 158, beginning at the 57th minute in the hour in which the manual switch 270 was depressed. Such activation of relay 158 causes a one-hour correction with the use of D.C. current of reverse polarity. This also conditions the autoset mechanisms to arrest all time recorder clocks when they reach their respective 57th minute.

Meanwhile, one-hour retard cam finger 290 of the one-hour retard cam 106 is transferred at the 57th minute and 10th second from level M to H. This action completes a circuit to the one-hour retard, twelve hour initiating relay 208. One-hour retard relay 302 is subsequently energized by the action of one-hour retard, twelve hour initiating relay 208 closing contacts 220. Such activation of relay 302 establishes an auxiliary circuit to the one-hour correction relay 158 (as hereinbefore described). Relay 158 now energizes electromagnet 54 with a reverse polar current and thereby conditions the autoset mechanism for a period of approximately one hour (see FIGURE 7).

At the end of said one-hour retard period, the one-hour correction signal is transmitted to the signal relay 134 which then re-energizes correction motor 100. Cams 102, 104 and 106 now commence a second 2 minute rotation (see lower right portion of FIGURE 7). At approximately 57′ 05″, cam finger 290 drops from level M to L of cam 106, whereupon contacts 298 open and drop the one-hour retard relay 302. Switch 314, associated with relay 302, opens and breaks one portion of the parallel circuit to the one-hour correction relay 158. At the 58th minute, cam finger 146 drops from level H to M of cam 102, opens contact 156 and allows relay 158 to de-energize. Energy is again restored to minute motor 56 when cam finger 157 drops from level M to L of cam 104 and allows closure of contact 67. The recorder clocks now advance to the 58th minute, on time with the master clock. Shortly after the 58th minute, cam finger 146 drops from level M to L of cam 102 and removes the current source to correction motor 100. All correction cams now remain quiescent until the next correction signal is transmitted at 56′ 10″ of the subsequent hour.

It should be obvious that the several corrections described in detail provide full correction means for a master-secondary clock system. Each secoondary clock is corrected on an hourly, and a twelve hourly basis. In addition, in transferring from daylight to standard time, the mechanism effects a one-hour retard which is useful to automatically set the secondary clocks back one hour. Thus, a technician (or unskilled person) may close switch 270 but once each year to effect a one-hour retard operation. All other functions are completely automatic.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a master-secondary clock system wherein a secondary clock is advanced by minute impulses of electrical current, correction and synchronization mechanisms for overriding said minute impulses and effecting a multiple of periodic corrections in said secondary clock for advancing it to a predetermined setting comprising, in combination,
initiating means for initiating said corrections,
a multiple of profiled discs adapted for rotation,
means responsive to said initiating means to rotate said discs,
an electromagnetic advancing means in said secondary clock,
switches associated with each of said discs and circuits associated with each of said switches for supplying electrical current of differing polarities to energize said electromagnetic advancing means,
an armature forming part of said advancing means,
a pair of contacts adjacent said armature in series circuit with said electromagnetic advancing means,
and means including said armature effecting operation of said contacts to energize and de-energize said electromagnetic advancing means during said periodic corrections until said secondary clock is arrested at a predetermined setting.

2. The apparatus of claim 1 wherein said arresting means includes a lever influenced by said electromagnetic advancing means for blocking said armature and disabling said series circuit to said electromagnetic advancing means.

3. In a master-secondary clock system wherein a secondary clock is advanced by minute impulses of D.C. current, correction and synchronization mechanisms adapted to override said normal minute impulses and effect a multiple of periodic corrections in said secondary clock for advancing it to a predetermined setting comprising, in combination,
initiating means for initiating said corrections,
a multiple of three-level discs adapted for rotation,
a correction motor,
means responsive to said initiating means for activating said motor to rotate said discs in unison,
an electromagnetic advancing means in said secondary clock,
switches controlled by each of said discs and circuits controlled by each of said switches for supplying D.C. current of differing polarities to said electromagnetic advancing means,
each of said switch controlled circuits including relay means for predetermining the current polarity to be supplied to said electromagnetic advancing means,
an armature forming part of said advancing means,
a pair of contacts adjacent said armature and in series circuit with said electromagnetic advancing means,
and means including said armature to effect operation of said contacts to energize and de-energize said electromagnetic means during said periodic corrections to advance said secondary clock to said predetermined setting.

4. In a master-secondary clock system wherein each secondary clock is normally advanced by generated minute impulses and periodic corrections are made to synchronize each secondary clock with a master clock comprising, in combination,
a secondary clock having an electromagnet therein,
an armature and armature actuated advancing means in said secondary clock,
a source of electrical current,
means for generating additional impulses in said secondary clock during said periodic corrections including,
a pair of contacts adjacent said armature adapted to be opened but normally urged to a closed condition and arranged in series circuit with said source of electrical current and said electromagnet,
and means integral with one of said pair of contacts directly operated by said armature actuation effective to de-energize and energize said electromagnet by opening and closing said contacts to cause advance of said secondary clock by said advancing means.

5. The combination set out in claim 4 and,
a timing relay in circuit with said pair of contacts, said contacts upon actuation by said armature causing said timing relay to de-energize and energize,
and means associated with said relay upon operation thereof to transmit said additional impulses to said electromagnet for advancing said secondary clock during said periodic corrections.

6. In a master-secondary clock system wherein a secondary clock is advanced by current impulses, a correction and synchronization mechanism for effecting an hourly correction cycle in said secondary clock comprising, in combination,
an electromagnet in said secondary clock for receiving impulses of positive and negative current fed to a first and second side thereof,
a correction relay,
initiating means for initiating a correction,
cam disc means including a profiled disc,
a correction motor operatively connected to said switching means,
means responsive to said initiating means to cause activation of said correction motor for initial rotation of said profiled disc,
a plurality of switches associated with said cam disc, each of said switches being in series with a first and a second circuit, said first circuit being a correction motor hold-in-circuit, said second circuit being a current supply controlling circuit containing said correction cycle relay,
said relay having a plurality of switches associated therewith and controlled thereby for controlling the supply of said positive and negative current to said first and second side of said electromagnet,
an armature associated with said electromagnet,
means in said secondary clock actuated by receipt of said negative current to said second side of said electromagnet to arrest said secondary clock at a predetermined minute setting,
and a pair of contacts brought into circuit by operation of said relay switches and directly actuated by said armature for rapidly, intermittently interrupting said negative current supply to said electromagnet whereby said secondary clock is advanced to said predetermined minute setting.

7. In a master-secondary clock system wherein the secondary clock is advanced by current impulses, a cyclic correction and synchronization mechanism for effecting hourly and other than hourly corrections in said secondary clock by controlling said current supplied thereto comprising, in combination, an electromagnet in said secondary clock for receiving impulses of positive and negative current fed to a first and second side thereof, common initiating means for initiating said corrections, cam disc switching means including a plurality of profiled discs, means responsive to said initiating means and said switching means for starting said corrections, a correction motor limitedly activated by said initiating means, other means to retain said motor activated during said corrections, said motor when activated rotating said profiled discs at a predetermined rate of rotation, a plurality of correction relays each having a plurality of switches associated therewith, at least one of said cam switches being in circuit with at least one of said correction relays for controlling the supply of positive and negative current to said first and second side of said electromagnet during said corrections, an armature associated with said electromagnet, and a pair of contacts brought into circuit during energization of one of said relays and directly actuated by said armature during said electromagnet operation for intermittently interrupting said current to said electromagnet whereby said secondary clock is advanced to a predetermined minute setting.

8. The combination set out in claim 7 and means in the secondary clock to arrest it at a predetermined minute setting.

9. In a master-secondary clock system wherein a master clock causes an hourly correction signal to be emitted for synchronizing the secondary clock therewith and the secondary clock is normally advanced by minute impulses of current supplied to an electromagnet advancing means therein, correction and synchronization mechanism effective to correct then stop said secondary clock for one hour comprising, in combination, initiating means controlled by said hourly correction signal for commencing said correct and stop operation, a first and a second profiled disc, a correction motor operatively connected to said discs, means responsive to said initiating means to cause activation of said correction motor for rotating said discs, a plurality of switches associated with said first profiled disc, each of said switches being in series circuit with a separate energizing circuit, one circuit including a current polarity control relay for reversing the current polarity when energized to said electromagnet, means on said first profiled disc to cause energization of said polarity control relay, a stop relay, a plurality of other switches under control of said second profiled disc, said other switches being in circuit with said stop relay, means including said other switches to energize said stop relay to establish an alternate hold circuit for said current polarity control relay, means in said secondary clock actuated in accord with the type of current routed to said electromagnet by said polarity control relay energization to arrest said secondary clock advancing means at a predetermined minute setting, an armature for said electromagnet, a pair of contacts brought into circuit during energization of said polarity control relay associated with said armature for rapidly, intermittently interrupting said routed current to said electromagnet whereby said secondary clock is advanced to said predetermined minute setting, and means to hold said stop and polarity control relays energized to cause said arrest means to remain effective until a new hourly signal is emitted from said master clock.

10. The combination set out in claim 9 and means on said second profiled disc to cause termination of said stop operation after a new hourly signal following said first hourly signal is emitted from said master clock.

11. The combination set out in claim 9 wherein said means to energize said stop relay includes a conditioning relay that energizes when said other switches under control of said second profiled disc are closed.

12. The combination of claim 9 wherein said profiled discs are each formed with low, medium and high levels for effecting the switching operations set out therein.

13. In a master-secondary clock system wherein a secondary clock is advanced by minute impulses and periodic corrections are made to correct and synchronize the secondary clock with the master clock to a predetermined minute setting, the improvement comprising, in combination, an armature, armature actuated advancing means, an electromagnet located adjacent said armature, a source of electric current, a switch assembly having a pair of normally closed contacts arranged in series circuit with said source of current and said electromagnet, said assembly operatively connected to said armature, a timing relay in circuit with said pair of contacts during said period corrections, said contacts upon actuation by said armature causing said timing relay to de-energize and energize, and means associated with said timing relay upon operation thereof to transmit correction impulses to said electromagnet for rapidly advancing said secondary clock during said periodic corrections.

14. The combination of claim 13 and correction relay means effective when operated to by-pass said minute impulses and arrange said timing relay in circuit with said pair of contacts.

15. The combination of claim 13 and means for arresting said secondary clock at said predetermined minute.

References Cited in the file of this patent

UNITED STATES PATENTS

| | | |
|---|---|---|
| 2,039,084 | Keilien | Apr. 28, 1936 |
| 2,393,789 | Lorenz | Jan. 29, 1946 |
| 2,972,222 | Rast | Feb. 21, 1961 |